US012769849B2

(12) United States Patent
Ben Kalifa et al.

(10) Patent No.: US 12,769,849 B2
(45) Date of Patent: Oct. 20, 2026

(54) SYSTEM AND METHOD FOR DISCOVERING AND RECOMMENDING MISSING SYSTEM INTEGRATIONS IN A COMPUTING ENVIRONMENT

(71) Applicant: Wiz, Inc., New York, NY (US)

(72) Inventors: Aviram Ben Kalifa, Tel Aviv (IL); Eshel Yaron, Amsterdam (NL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/178,393

(22) Filed: Apr. 14, 2025

(65) Prior Publication Data

US 2026/0320193 A1 Oct. 15, 2026

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01); *G06F 2221/2141* (2013.01)

(58) Field of Classification Search
CPC ................. G06F 21/577; G06F 21/552; G06F 2221/2141
See application file for complete search history.

(56) References Cited

U.S. PATENT DOCUMENTS 7,724,670 B2 5/2010 Nilakantan et al.
8,271,615 B2 * 9/2012 Ellison ................ H04L 41/0233 709/219
9,578,063 B1 * 2/2017 Iyer ..................... G06F 9/45558
10,565,001 B2 2/2020 Nakil et al.
10,932,142 B2 2/2021 Ashrafi
11,184,294 B1 * 11/2021 Maldonado Arjona ...................... H04L 69/329
12,105,807 B1 10/2024 Bagh
2001/0033550 A1 10/2001 Banwell et al.
2006/0089932 A1 * 4/2006 Buehler .............. G06F 21/6218 707/999.009
2009/0248856 A1 * 10/2009 Chatterjee ............. G06F 9/5055 709/224
2013/0117554 A1 * 5/2013 Ylonen ................. H04L 9/0891 713/151
2019/0182287 A1 6/2019 Hanley et al.
2019/0281072 A1 9/2019 Al Khater
2020/0137097 A1 4/2020 Zimmermann et al.
2020/0153855 A1 * 5/2020 Kirti ....................... H04L 63/20
2020/0396261 A1 * 12/2020 Bhatia .................... G06N 5/027
2022/0046059 A1 2/2022 Pandurangi (Continued)

*Primary Examiner* — Sheweye Gelagay
*Assistant Examiner* — Samikshya Poudel
(74) *Attorney, Agent, or Firm* — M&B IP Analysts, LLC

(57) ABSTRACT

A method and system for identifying and recommending missing system integrations are presented. The method includes obtaining data from one or more integrated systems in a computing environment; identifying one or more references from the data that correspond to an unintegrated system in the computing environment, herein identifying the one or more references includes comparing the one or more references against a list of integrated systems; mapping the one or more references to at least one security finding corresponding to the computing environment; generating at least one suggested connection to the unintegrated system based on the mapping; and establishing a connection to the unintegrated system based on the at least one suggested connection.

19 Claims, 7 Drawing Sheets

(56) References Cited

U.S. PATENT DOCUMENTS

| | | | | |
|---|---|---|---|---|
| 2022/0166783 | A1* | 5/2022 | Yavo | H04L 63/1425 |
| 2022/0330022 | A1 | 10/2022 | Kolekar et al. | |
| 2023/0091450 | A1 | 3/2023 | Ramesh et al. | |
| 2023/0111043 | A1 | 4/2023 | Antonio et al. | |
| 2023/0224292 | A1 | 7/2023 | Nadiminti et al. | |
| 2025/0227124 | A1 | 7/2025 | Tishbi et al. | |
| 2025/0307424 | A1 | 10/2025 | Havdala et al. | |

* cited by examiner

SYSTEM AND METHOD FOR DISCOVERING AND RECOMMENDING MISSING SYSTEM INTEGRATIONS IN A COMPUTING ENVIRONMENT

TECHNICAL FIELD

The present disclosure relates generally to security analytics in computing environments, and more particularly to techniques for discovering and recommending missing system integrations to enhance security analysis and remediation in a computing environment.

BACKGROUND

Modern computing environments often involve multiple services, tools, and platforms that collectively manage infrastructure, code deployment, and security oversight. Different groups or stakeholders may independently adopt various version control systems, container registries, continuous integration pipelines, and security scanning tools. Although each system can provide useful data and functionality, they often operate in silos, making it difficult to gain a holistic view of security across the environment.

As computing environments grow more complex, administrators and security teams may be unaware of all the services in actual use. For example, infrastructure logs or cloud configuration data might reference services or registry endpoints that are neither monitored nor integrated into a central analytics workflow. This gap between known and unknown services can slow incident investigation, root cause analysis, or remediation, since crucial information remains inaccessible or undiscovered. While conventional practices may involve manual discovery and documentation, such approaches can be time-consuming and prone to oversight in large or continuously evolving environments.

It would therefore be advantageous to provide a solution that would address the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Embodiments of the present disclosure may be provided as a network of communicating devices (i.e., a "computerized network"). Embodiments of the invention may be also provided as a software application downloadable into a computer device to facilitate the method. The software application may be a computer program product, which may be stored on a non-transitory computer-readable medium on a tangible data-storage device (such as a storage device of a server, or one within a user device).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include obtaining data from one or more integrated systems in a computing environment; identifying one or more references from the data that correspond to an unintegrated system in the computing environment, where identifying the one or more references includes comparing the one or more references against a list of integrated systems; mapping the one or more references to at least one security finding corresponding to the computing environment; generating at least one suggested connection to the unintegrated system based on the mapping; and establishing a connection to the unintegrated system based on the at least one suggested connection. Other embodiments of this aspect include corresponding computer systems, apparatus, and computer programs recorded on one or more computer storage devices, each configured to perform the actions of the methods.

Implementations may include one or more of the following features. The method may include retrieving logs or configuration data from at least one resource within the computing environment to identify additional references to the unintegrated system. The method where identifying the one or more references may include applying a rule-based detection matrix that defines how to parse different data sources for potential unintegrated systems. The method may include partially integrating the unintegrated system by granting restricted or read-only access credentials prior to establishing full integration. The method may include maintaining a historical record of discovered unintegrated systems, correlated security findings, and generated suggested connections to facilitate future audits or compliance checks. The method where generating the at least one suggested connection may include determining a rationale for integrating the unintegrated system, the rationale including an indication of uncovered vulnerabilities or misconfigurations. The method may include: analyzing usage metrics associated with the unintegrated system to refine the at least one suggested connection, where the usage metrics correspond to how often the unintegrated system is referenced. The method may include receiving an indication from an authorized entity whether to proceed with or reject the at least one suggested connection, and recording the indication in a decision log. The method may include automatically integrating some or all sub-resources of the unintegrated system upon determining that partial credentials or overarching permissions are available. The method may include computing a prioritization metric for the unintegrated system based on at least a frequency with which the unintegrated system is referenced in the obtained data. Implementations of the described techniques may include hardware, a method or process, or a computer tangible medium.

In one general aspect, a non-transitory computer-readable medium may include one or more instructions that, when executed by one or more processors of a device, cause the device to: obtain data from one or more integrated systems in a computing environment. A non-transitory computer-readable medium may also identify one or more references from the data that correspond to an unintegrated system in the computing environment, where identifying the one or more references includes comparing the one or more references against a list of integrated systems. The medium may furthermore map the one or more references to at least one security finding corresponding to the computing environment. The medium may in addition generate at least one suggested connection to the unintegrated system based on the mapping. The medium may moreover establish a connection to the unintegrated system based on the at least one suggested connection. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: obtain data from one or more integrated systems in a computing environment. The system may in addition identify one or more references from the data that correspond to an unintegrated system in the computing environment, where identifying the one or more references includes comparing the one or more references against a list of integrated systems. The system may moreover map the one or more references to at least one security finding corresponding to the computing environment. The system may also generate at least one suggested connection to the unintegrated system based on the mapping. The system may furthermore establish a connection to the unintegrated system based on the at least one suggested connection. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: retrieve logs or configuration data from at least one resource within the computing environment to identify additional references to the unintegrated system. The system where processing circuitries the one or more processors, when identifying the one or more references, are configured to apply a rule-based detection matrix that defines how to parse different data sources for potential unintegrated systems. The system where the memory contains further instructions which when executed by the processing circuitry further configure the system to: partially integrate the unintegrated system by granting restricted or read-only access credentials prior to establishing full integration. The system where the memory contains further instructions which when executed by the processing circuitry further configure the system to: maintain a historical record of discovered unintegrated systems, correlated security findings, and generated suggested connections to facilitate future audits or compliance checks. The system where processing circuitries the one or more processors, when generating the at least one suggested connection, are configured to determine a rationale for integrating the unintegrated system, the rationale including an indication of uncovered vulnerabilities or misconfigurations. The system where the memory contains further instructions which when executed by the processing circuitry further configure the system to: analyze usage metrics associated with the unintegrated system to refine the at least one suggested connection, where the usage metrics correspond to how often the unintegrated system is referenced. The system where the memory contains further instructions which when executed by the processing circuitry further configure the system to: receive an indication from an authorized entity whether to proceed with or reject the at least one suggested connection, and recording the indication in a decision log. The system where the memory contains further instructions which when executed by the processing circuitry further configure the system to: automatically integrate some or all sub-resources of the unintegrated system upon determining that partial credentials or overarching permissions are available. The system where the memory contains further instructions which when executed by the processing circuitry further configure the system to: compute a prioritization metric for the unintegrated system based on at least a frequency with which the unintegrated system is referenced in the obtained data. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
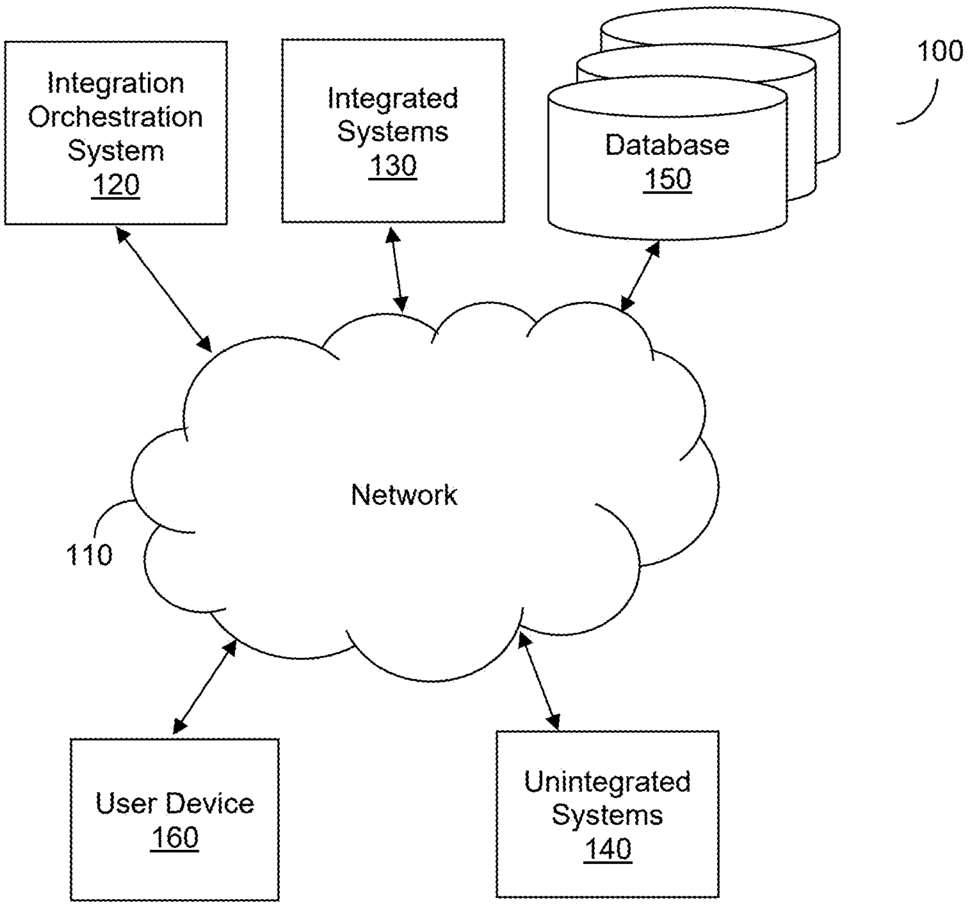
FIG. 1 is an example network diagram showing a computing environment in which an integration orchestration system communicates with various computing systems, in accordance with an embodiment of the present disclosure.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

As used herein, the term "unintegrated system" refers to a resource, service, or platform within a computing environment that has not yet been onboarded or connected. Such a system may include, but is not limited to, container registries, source-control platforms, cloud accounts, or security scanning tools that remain unconnected to a central management solution.

As used herein, the term "security finding" refers to a discovered or suspected security issue in a computing environment. Such issues may include, but are not limited to, vulnerabilities, misconfigurations, or exposures that negatively impact an organization's security posture. A security finding may be detected by automated scanning tools, discovered during a root-cause analysis, or identified by correlating logs and configuration data across multiple systems.

As used herein, the term "suggested connection" refers to a recommended integration action created by the system upon discovering an unintegrated system. A suggested connection may include details about the system to be connected, an explanation of the benefits gained by integrating it (e.g., improved visibility or remediation coverage), and any required credentials or authorization steps.

As used herein, the term "shadow resource" refers to a system or tool that exists within an organization's environment but is either unknown to or not centrally managed by the security or operations teams. Examples of shadow resources include unnoticed container registries, unmanaged repositories, or unrecognized cloud subaccounts.

As used herein, the term "root-cause analysis" refers to the process of tracing a discovered security vulnerability or misconfiguration back to its underlying source. Root-cause analysis may involve correlating data from multiple systems or logs to pinpoint the code repository, pipeline configuration, or infrastructure definition responsible for the issue.

As used herein, the term "partial integration" refers to a limited or provisional onboarding of an unintegrated system where only partial credentials or restricted scopes are used. Partial integrations may enable read-only access, demonstration functionality, or other reduced-permission features prior to full onboarding.

As used herein, the term "onboarding" refers to the procedure by which an unintegrated system is recognized, configured, and granted the necessary credentials or permissions to allow a central integration orchestration system to access and manage the system's data, logs, or configuration details for correlation, root-cause analysis, and remediation workflows. This process may involve user-supplied authorization, automated credential discovery, or a combination thereof, depending on organizational or security requirements.

As used herein, the term "integrated system" refers to a resource, service, or platform within a computing environment that has already been onboarded and is actively managed by a central orchestration system. Such a system may include, but is not limited to, container registries, source-control platforms, cloud accounts, or security scanning tools that have completed the onboarding process.

FIG. 1 is an example network diagram showing a computing environment 100 in which an integration orchestration system 120 communicates with various computing systems, in accordance with an embodiment of the present disclosure.

In some embodiments, the integration orchestration system 120 is configured to operate as a central hub for identifying unintegrated systems, analyzing data from already connected resources, and generating suggested connections. In some embodiments, the integration orchestration system 120 may implement automated data retrieval (e.g., batch or incremental polling of logs and configuration files), correlation logic to associate detected references with specific vulnerabilities, and suggestion workflows to prompt authorized users regarding new or missing integrations. This integration orchestration system 120 may initiate or manage both partial integrations and fully automatic onboarding, depending on available privileges or credentials.

In some embodiments, integrated systems 130 may include resources and services within the computing environment 100 that have already been onboarded. For example, the integration systems 130 may include source-control platforms, container registries, cloud accounts, or security scanning solutions that provide logs, configuration information, and other metadata to the integration orchestration system 120. The integrated systems 120 may be continuously monitored and correlated, enabling users to track remediation statuses, root-cause analyses, and historical trends.

In some embodiments, unintegrated systems 140 include services or platforms not yet connected to the integration orchestration system 120. In some embodiments, the unintegrated systems 140 may be "shadow resources," i.e., resources or tools that exist within an organization's environment but are neither recognized nor actively managed by security or operations teams. For example, logs may reveal references to JFrog Artifactory or quay.io container registries not yet onboarded, or commit histories may uncover Snyk scanning steps in the build pipeline without a recognized Snyk integration. The shadow resources may be uncovered by analyzing ephemeral logs from container orchestration platforms (e.g., EKS or ECS), commit histories referencing unfamiliar scanning solutions, or state files containing references to unaccounted—for accounts or container registries. Once identified, the shadow resources can be flagged for potential onboarding, after which suggested connections may be generated for manual or automatic integration.

In some embodiments, a database 150 may be configured to store information pertinent to both integrated and unintegrated systems, such as lists of known integrations, references to suspicious or unrecognized resources, and records of previous discovery events. The database 150 may also store historical logs of suggested connections (e.g., accepted or rejected), root-cause mappings, and various credentials or policy configurations. By centralizing these datasets, the database 150 supports processes including correlation, prioritization, and onboarding workflows.

In some embodiments, a network 110 is configured to facilitate communication among the components of the computing environment 100, including the integration orchestration system 120, the database 150, integrated systems 130, unintegrated systems 140, and user device 160. For example, the network 110 may be a LAN, WAN, or cloud-based infrastructure that leverages secure communication protocols to ensure authorized data exchange. The network 110 supports automated retrieval of logs or resource descriptors as well as user interactions for reviewing and accepting suggested connections.

In some embodiments, a user device 160 may be a client interface through which authorized users interact with the integration orchestration system 120. In some embodiments, the user device 160 may display dashboards containing findings, flagged references, or suggested connections, and allow users to provide credentials or configuration parameters for new integrations. Real-time updates from the integration orchestration system 120 to the user device may be enabled, facilitating acceptance or rejection of integration suggestions and enabling remediation activities.

Figure 2:
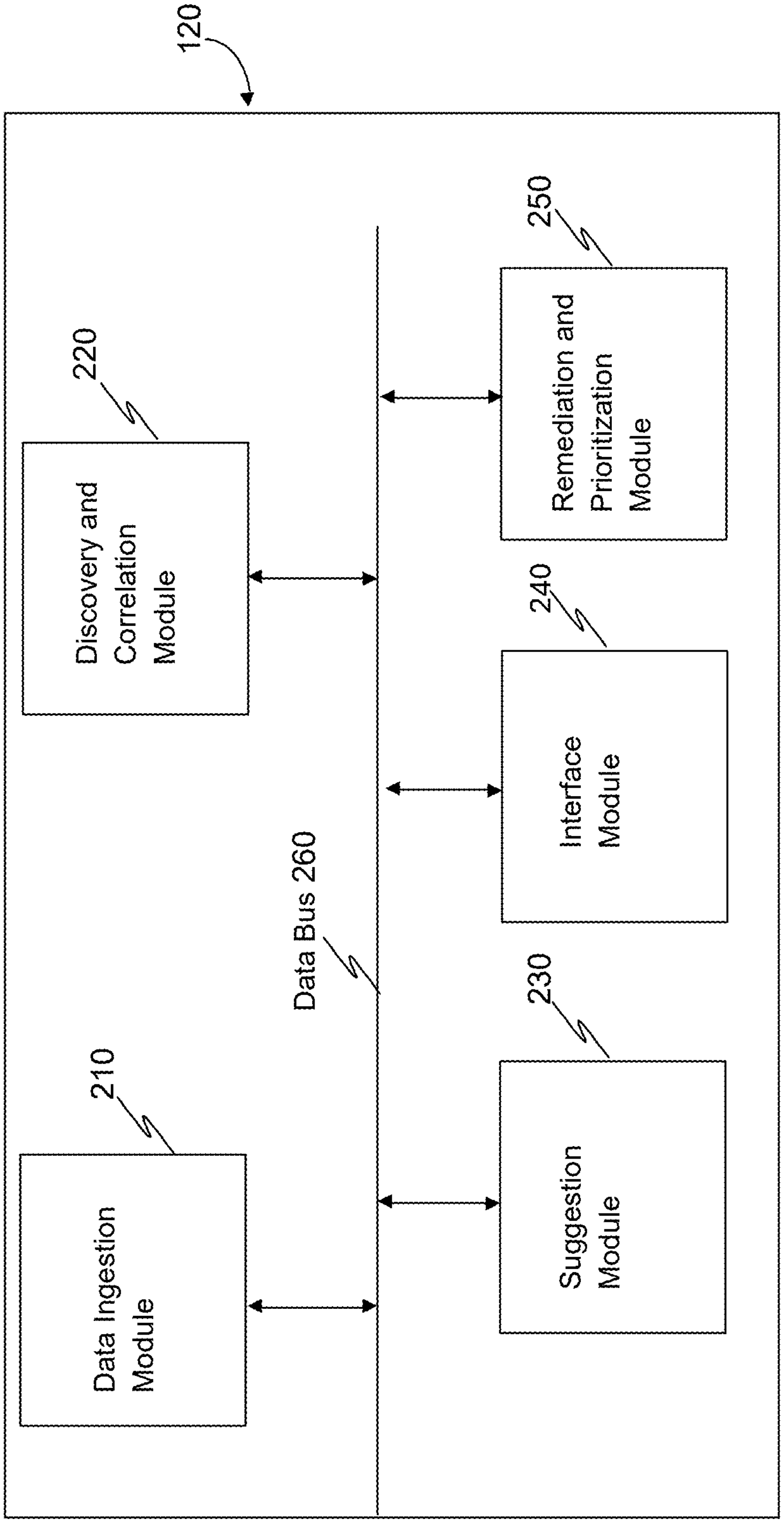
FIG. 2 is an example schematic diagram showing functional modules of the integration orchestration system, in accordance with an embodiment of the present disclosure.

FIG. 2 is an example schematic diagram showing functional modules of the integration orchestration system 120, in accordance with an embodiment of the present disclosure.

In some embodiments, a data ingestion module 210 may be configured to obtain logs, resource descriptors, commit histories, or other pertinent metadata from systems already onboarded in environment 100. In some implementations, the data ingestion module 210 may periodically request updates from integrated systems 130 or respond to push notifications when new logs or configuration updates become available. For example, the logs may include AWS CloudTrail events, Docker pull statements, or pipeline logs from Jenkins, from which new integration targets can be discovered. Once collected, these inputs may be transmitted to the data bus 260, where they are accessible by the other modules for further discovery, correlation, or remediation analysis.

In some embodiments, a discovery and correlation module 220 may be configured to receive ingested data from the data ingestion module 210 via data bus 260 and examine the ingested data for evidence of unintegrated systems 140. The discovery and correlation module 220 may apply string matching, heuristic rules, or domain-specific pattern checks (e.g., detecting container image references that do not match known registries) to identify resources that are not yet onboarded. In certain implementations, the discovery and correlation module 220 leverages a "rule-based matrix mapping" to systematically detect missing connections. Conceptually, each row in the matrix corresponds to an existing data source (e.g., AWS logs, GitHub commits, container registry manifests), and each column corresponds to a potentially missing integration type (e.g., JFrog Artifactory, Snyk, Terraform, or GitHub). Each cell in this matrix outlines specific detection rules (e.g., how to parse a log field or commit message) and describes what pattern indicates a new or shadow integration. By applying these cell-specific rules, the discovery and correlation module 220 can infer that certain references (e.g., "quay.io") point to an unintegrated container registry, or that certain pull requests referencing "snyk fix" indicate a missing Snyk integration.

In some embodiments, the discovery and correlation module 220 also correlates newly uncovered references to existing security findings (e.g., vulnerabilities or misconfigurations), thereby enabling further root-cause analysis for remaining security issues. Additionally, the discovery and correlation module 220 may detect missing integrations by identifying partially failed root-cause analyses (e.g., a known misconfigured AWS resource that apparently originated from Terraform code, but no matching SCM integration is found). In some embodiments, any discovered unintegrated systems or shadow resources, along with their associated findings, are transmitted via the data bus for subsequent prioritization and suggestion generation.

In some embodiments, a suggestion module 230 processes outputs from the discovery and correlation module 220 to generate suggested connections for any flagged unintegrated systems. In some embodiments, the suggestion module 230 may aggregate metadata associated with each flagged resource, including the severity of any correlated vulnerabilities, the number of unresolved findings that could be addressed by integrating the missing resource, and usage patterns (e.g., frequency of references in logs). Based on these factors, the suggestion module 230 produces recommendations that highlight the rationale for establishing the connection. The suggestion module 230 then transmits these suggestions to the data bus 260. A subsequent process, whether automated or user-driven, may retrieve the suggestions to accept, reject, or partially integrate the unintegrated system, depending on available credentials or policy requirements.

In some embodiments, a remediation and prioritization module 250 is configured to compute risk-based or impact-based metrics indicating how quickly each unintegrated system should be onboarded. This determination may consider factors such as the potential impact or exploitability of correlated vulnerabilities, the scope of unresolved findings, and whether the system is essential to an organization's production environment. In some embodiments, the Remediation and Prioritization Module (250) assigns numeric or qualitative scores (e.g., 0-100 or "High Priority") to suggested connections, indicating the relative urgency or value of integrating each flagged resource. Usage patterns may be measured, for example, by how frequently a container registry is pulled from, how many commits reference a particular security tool, or how often an unintegrated service appears in deployment logs. By associating these prioritized outcomes with the relevant suggestions, the remediation and prioritization module 250 ensures that integration efforts focus first on the resources yielding the most significant improvement in remediation coverage or completeness of root-cause analysis.

In some embodiments, an interface module 240 is configured to enable user interaction for reviewing and acting upon suggested connections, logging decisions, or providing credentials for new integrations. For example, upon receiving a suggestion from the suggestion module 230, the interface module 240 may display a prompt via a web-based dashboard or API. Users can accept or reject the suggestion, supply necessary tokens, or specify partial integration if limited permissions are available. In some embodiments, if the discovered resource's details (e.g., registry URL or organization name) are already known from logs, the interface module 240 can auto-fill those fields, requiring only that the user enter the missing credential. These user inputs may be transmitted to the data bus 260, enabling the other modules to update the status of flagged resources (e.g., finalizing a new connection once credentials are verified).

In some embodiments, a data bus 260 is configured to provide a communication infrastructure interconnecting the aforementioned modules of FIG. 2. In some embodiments, the data bus 260 employs an asynchronous communication mechanism allowing each module to exchange logs, discovered references, or suggested connections without establishing direct point-to-point connections. The data bus 260 may transmit logs and resource descriptors from the data ingestion module 210 to the discovery and correlation module 220, route newly identified unintegrated systems to the suggestion module 230 and transmit suggested connections along with prioritization information to the interface module 240.

Figure 3:
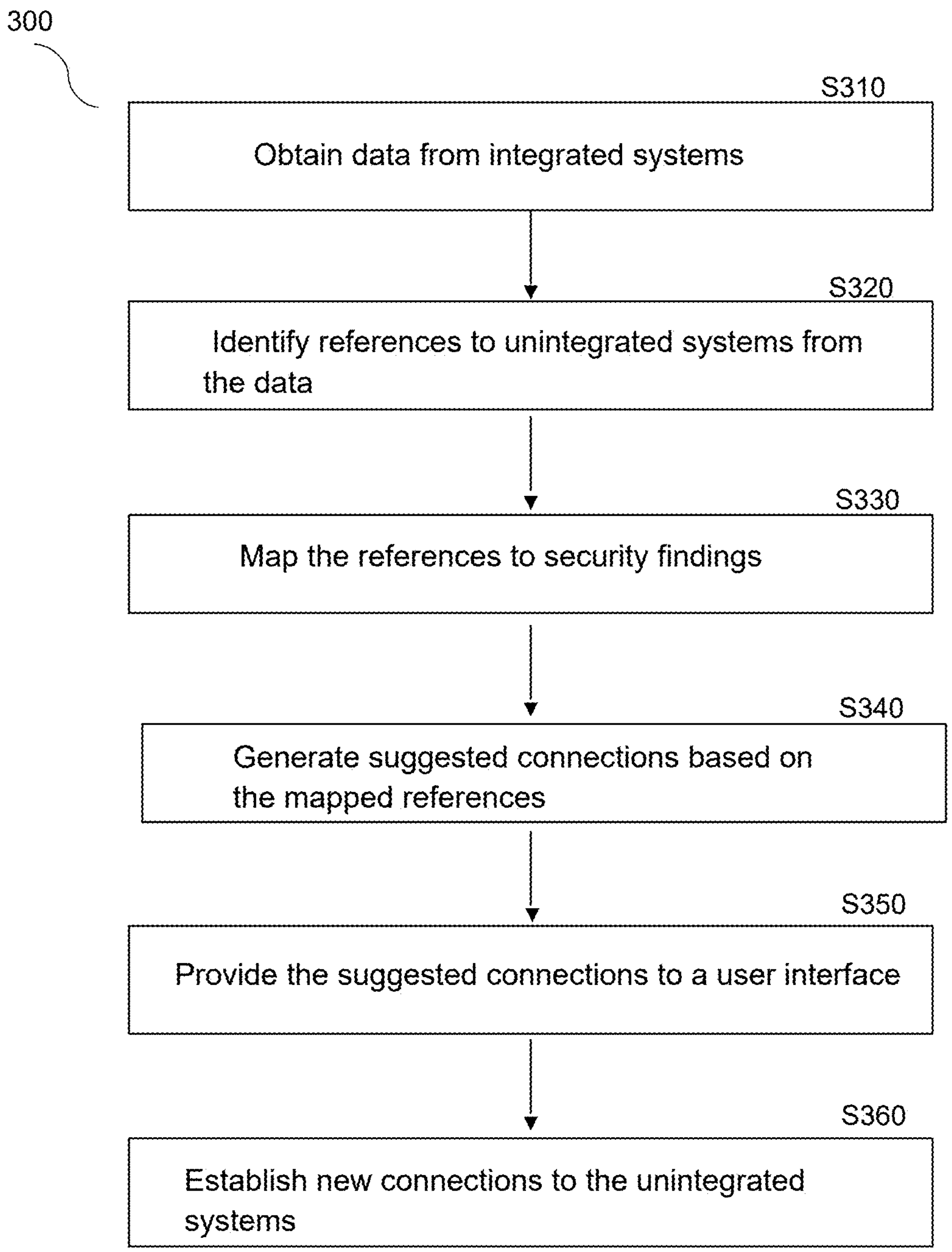
FIG. 3 is an example flowchart showing a process for retrieving data from existing connections, identifying missing integrations, and generating recommendations, in accordance with an embodiment of the present disclosure

FIG. 3 is an example flowchart illustrating a process 300 for retrieving data from existing connections, identifying missing integrations, and generating recommendations, in accordance with an embodiment of the present disclosure.

At S310, data from integrated systems is obtained. For example, logs, resource descriptors, or configuration files can be retrieved from previously established integrations to provide current context for subsequent operations. In some embodiments, the retrieval may be triggered by scheduled intervals or by events indicating new activity within those integrations. In other embodiments, ephemeral logs from a container orchestration platform (e.g., EKS or ECS) or commit histories in a version-control service can also be gathered for further analysis. For example, AWS EKS logs may reference pulling container images from "jfrog.company.com" or "quay.io," or GitHub commits may reference "snyk fix" steps in build pipelines. Notifications may be utilized so that recent changes, such as newly pushed container images or updated infrastructure-as-code definitions, are updated. In some embodiments, the obtained data is further used by a correlation engine to enable root-cause analysis across the environment. In some embodiments, the data retrieval process may be run on a batch or incremental basis (e.g., triggered by new commits) to ensure continuous discovery and up-to-date insights.

At S320, references to unintegrated connections are identified from the obtained data. Logs and commit messages from integrated resources frequently include references to third-party services, allowing detection of unfamiliar domains or tool identifiers (e.g., "quay.io" or "snyk fix"), and revealing that the corresponding container registry or security scanner may be in use but remain unintegrated. In some embodiments, patterns or indicators (such as URLs, domain names, or configuration keys) can be detected within logs or metadata captured from the integrated connections. These indicators may appear in Terraform state files, Jenkins pipeline definitions, container descriptors, or commit messages referencing specific tools (e.g., a security-scanning step in Snyk). By comparing such indicators against known integration details, "shadow" resources (e.g., unconnected container registries or source-control platforms) can be distinguished within a computing environment. In some implementations, partial identifiers (like AWS account IDs or GitHub organization names) are also detected, prompting further correlation steps. To orchestrate these checks, a rule-based matrix can be employed, where each data source (row) is matched against one or more prospective missing integration types (column). Each row-column cell enumerates the detection logic (e.g., substring patterns, file name matches, or commit-message analysis) that pinpoints the relevant unintegrated system. For example, in the row for "AWS logs" and the column for "JFrog Artifactory registry," the detection rule might specify that if a container image is pulled from a domain ending in "jfrog.io," a missing JFrog integration should be flagged. Likewise, in a row for "GitHub commits" and column for "Snyk scanning tool," commits referencing "snyk fix" or containing a Snyk-specific pipeline step trigger a missing Snyk integration suggestion.

At S330, the identified references are mapped to security findings (e.g., vulnerabilities or misconfigurations). For example, associations between the identified references and any known or suspected issues can be established by matching resource identifiers, container image names, or other unique markers. The mapped security findings may include misconfigured cloud entities, outdated software images, or unpatched libraries flagged by third-party scanning tools. In some embodiments, a root-cause analysis engine may be used to determine where missing context impedes full correlation of existing findings. For instance, if an AWS resource is confirmed to be managed via Terraform but no relevant Git repository has been integrated, the system notes that a source-control connection may be required to complete the analysis. By mapping the flagged references to existing or pending security concerns (e.g., publicly accessible S3 buckets or container images lacking root-cause traceability), the value of establishing a new connection is more clearly conveyed, particularly when additional contextual data is needed for remediation.

At S340, suggested connections are generated based on the mapped references. In some embodiments, recommendations can be formulated by compiling details about each mapped reference and any related security issues. For example, these details may include an explanation of how a new connection could enable improved root-cause analysis or more efficient remediation. Additional data points, such as an approximate number of unresolved findings or the severity of correlated vulnerabilities, can be included to provide a rationale for prioritizing each suggested connection. In some implementations, a quantitative or qualitative score (e.g., 0-100 or "High Priority") may be assigned based on how many existing findings would gain new coverage through the missing integration.

At S350, the suggested connections are provided to a user interface. For example, a listing or dashboard can be presented to a user that includes actionable items indicating the benefits or evidence linked to each suggested connection. In some embodiments, this presentation can be performed once all relevant references are analyzed or on a rolling basis as new references are discovered. Additionally, the suggestions may appear in a "Finding Drawer" or "Action Drawer" for specific issues, or in a "Connections" page with a summarized count of newly detected suggestions, mirroring the approaches described in the project files. By providing these suggestions through an interface with administrative oversight, such as a "Connections" page or embedded "Finding Drawer," acceptance or rejection of potential connections can be tracked and managed according to specific organizational requirements. In some embodiments, each suggested connection is accompanied by a list or count of specific findings that would become root-cause traceable if the missing connection is established.

At S360, new connections to the unintegrated references are established. In some embodiments, previously granted privileges that allow automatic onboarding of additional integrations may be applied, such as when a parent cloud account grants sufficient permissions for its subaccounts. In alternative embodiments, credential entry or other authorization measures are required from an appropriate party prior to finalizing the integration. Successful onboarding may include retrieving API tokens, configuring access scopes, or synchronizing policies, enabling the newly connected service to be used immediately in ongoing security and operational workflows. In some embodiments, if partial credentials are discovered, some or all sub-resources may be integrated automatically, enhancing coverage without additional manual input.

Figure 4:
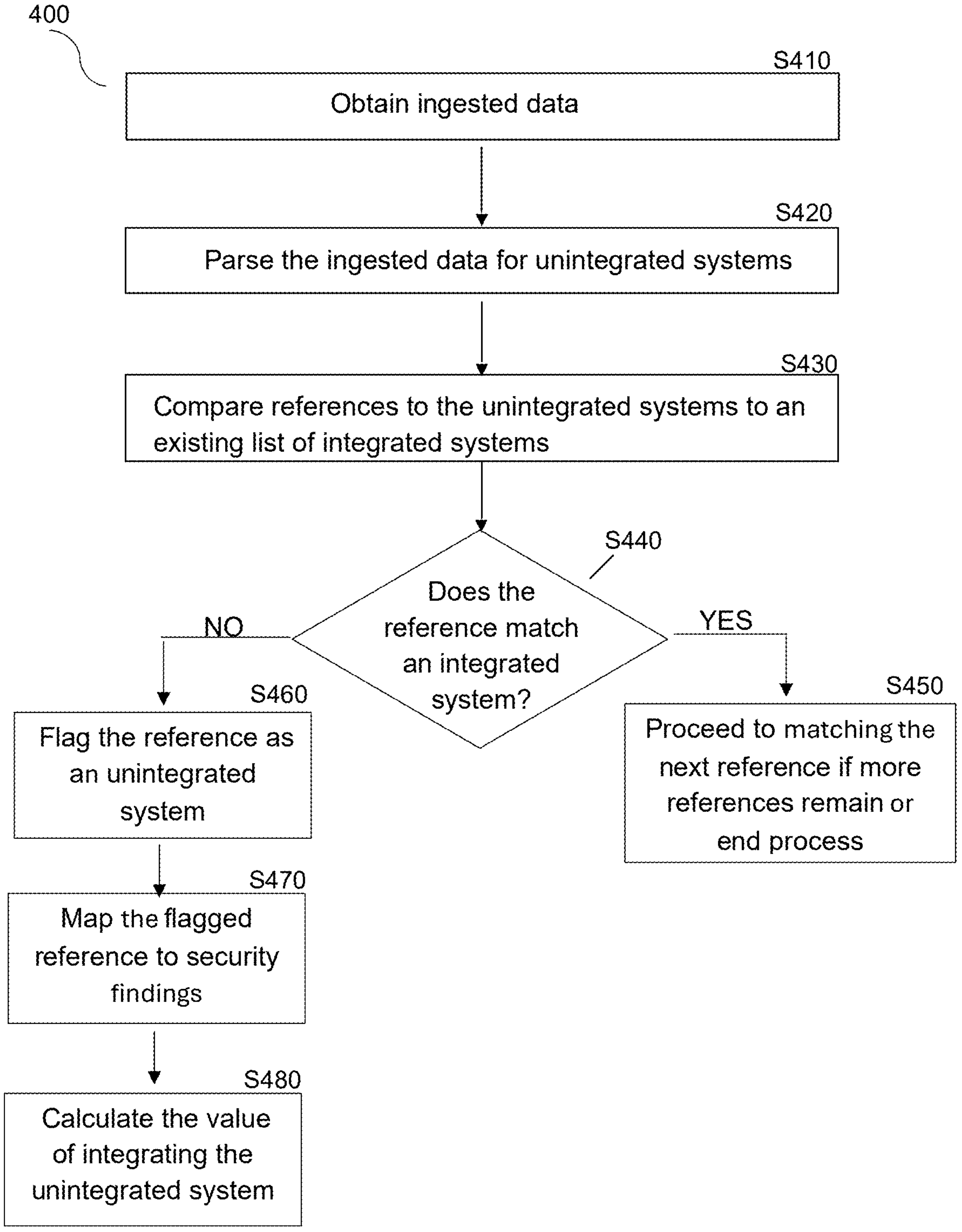
FIG. 4 is an example flowchart showing a process for parsing ingested data, discovering unintegrated systems, and mapping them to security findings, in accordance with an embodiment of the present disclosure.

FIG. 4 is an example flowchart showing a process 400 for parsing ingested data, discovering unintegrated systems, and mapping them to security findings, in accordance with an embodiment of the present disclosure.

At S410, ingested data is obtained. In some embodiments, logs, resource descriptors, or other metadata from already-recognized connections or environment sources may be retrieved for analysis. In some embodiments, data retrieval is initiated according to a schedule, while in others it is triggered when logs or configuration files are updated. Retrieving the ingested data ensures current information for detecting references to unintegrated connections, including any newly introduced resources or updates to existing ones.

At S420, the ingested data is parsed for unintegrated systems. For example, logs, commit histories, configuration files, or other metadata may be examined to detect patterns, such as domain names, registry URLs, or pipeline definitions, not recognized among existing integrations. In some embodiments, string-matching, fingerprinting, or heuristic rules are applied to isolate references pointing to external services or tooling (e.g., container registries, security scanners, or additional source-code repositories). In certain implementations, partial or indirect references, such as a mention of a "Snyk fix" commit or an account ID in AWS logs, are detected and the corresponding unintegrated system involved is inferred.

At S430, references to the unintegrated systems are compared to an existing list of integrated connections. For example, a listing of recognized integrations may be stored in a central database, and each newly discovered reference is checked against this list. In some embodiments, exact matching may be used when specific identifiers or endpoints are present. In alternative embodiments, approximate matching may be applied in cases where the discovered reference partially overlaps with existing naming patterns. Rule-based mappings may also be employed, such as code commits referencing specific scanning tools, or cloud logs referencing known container registry domains.

At S440, a check is performed to determine whether each reference matches any integrated connection. If the reference corresponds to an entry in the maintained list of known connections, processing flows to S450; otherwise, the flow continues to S460. In some implementations, a threshold can be established to define the level of similarity required to deem a reference a match. For example, subdomains or case variations might be treated as equivalent if they fall above a certain confidence score, while more significant discrepancies are deemed spurious. By applying this threshold, meaningful variations, such as development vs. production subdomains, may be captured without overcounting unintended references.

At S450, the process proceeds to matching the next reference or ends if no further references remain. For example, when multiple references appear in the ingested data, a loop structure may be implemented so that each reference is evaluated in turn. If no additional references require evaluation, the process 400 transitions to completion.

At S460, any reference that does not match an existing integration is flagged as an unintegrated connection. A record may be created indicating a likely gap in coverage for that reference. For example, newly encountered container registries, security scanners used by separate development teams, or unregistered code repositories might be flagged at this stage. Identifying and flagging these "shadow" items streamlines discovery and remediation by highlighting unrecognized tools or services.

At S470, the flagged reference is mapped to security findings (e.g. vulnerabilities or misconfigurations). In some embodiments, associations between the flagged reference and known or pending issues (e.g., container image vulnerabilities, cloud configuration faults) can be established by comparing resource tags or IDs. For example, if a flagged container registry URL is tied to images already detected as problematic, a direct mapping is recorded. Additionally, unresolved findings cannot be fully traced back to their origin may be noted, indicating the flagged reference is necessary for root-cause analysis.

At S480, the value of integrating the unintegrated connection is calculated. In some embodiments, a scoring or prioritization procedure is used to determine the likely benefit of onboarding the flagged unintegrated resource. For example, factors can include the severity and quantity of correlated findings, how many root-cause correlations remain incomplete, and whether the flagged resource is production-critical. Usage patterns may be tracked to see if the flagged resource is heavily utilized by development teams (e.g., if container images from a certain registry are pulled frequently, if numerous commits reference a scanning tool, or if an unintegrated service appears often in deployment logs). In some implementations, usage patterns may be tracked to see if the flagged resource is heavily utilized by development teams. If integrating that resource would significantly reduce investigation overhead or improve coverage, a higher priority or score is assigned. Presenting this calculated value helps administrators focus on the most impactful or time-sensitive integrations first, thereby optimizing remediation efforts.

Figure 5:
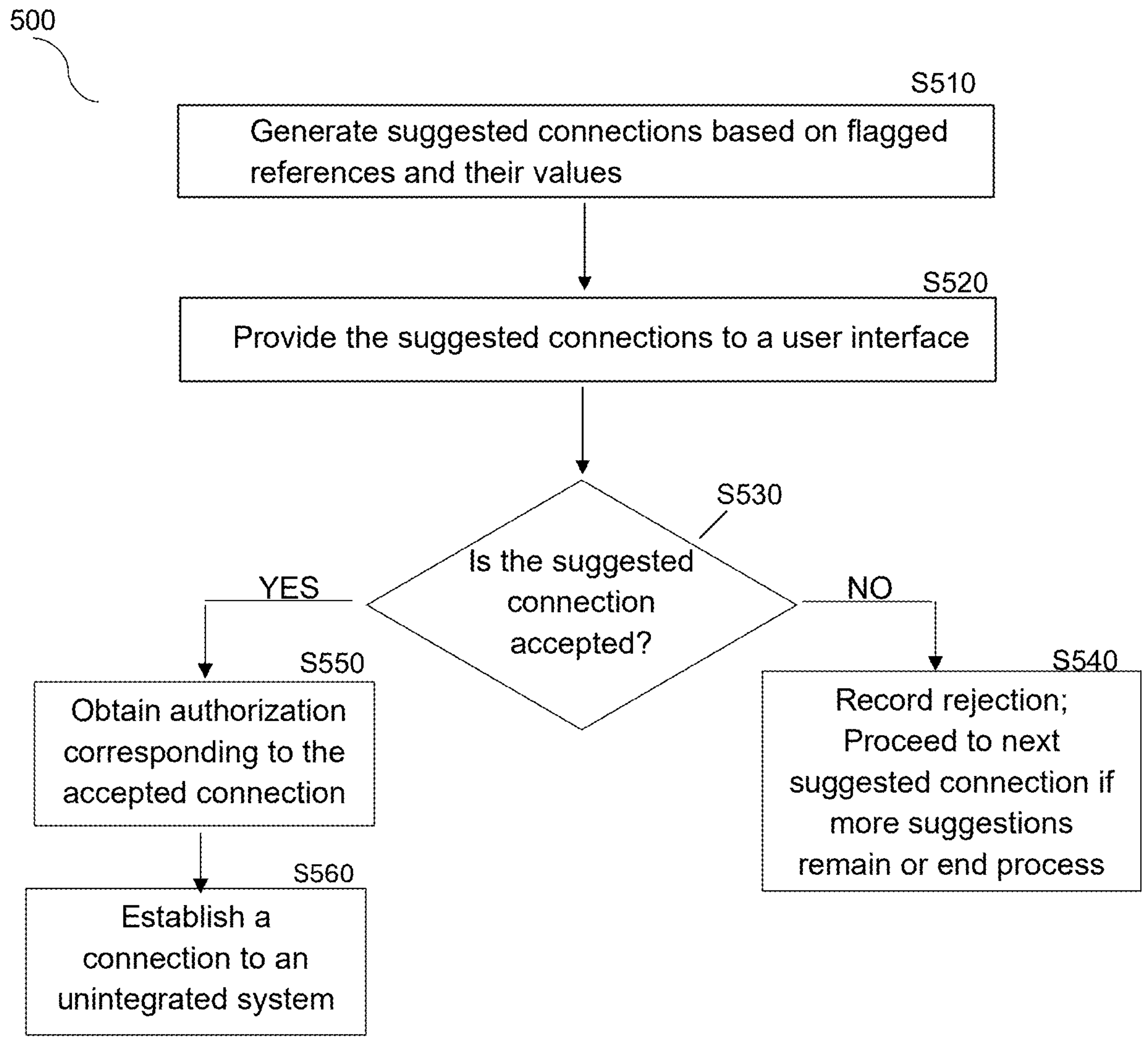
FIG. 5 is an example flowchart showing a process of presenting suggested connections to a user for acceptance or rejection, in accordance with an embodiment of the present disclosure.

FIG. 5 is an example flowchart showing a process 500 of presenting suggested connections to a user for acceptance or rejection, in accordance with an embodiment of the present disclosure.

At S510, suggested connections are generated based on flagged references and their values. For example, identified references and any associated benefit scores or priority indicators may be compiled into a set of recommended integrations. In some embodiments, details about potential remediation gains or expanded root-cause analysis capabilities are included for each suggestion. By collecting flagged references along with rationale such as improved coverage or known findings impacted a list of proposed connections is produced and can be sorted by priority.

At S520, the suggested connections are provided to a user interface. In some embodiments, information pertaining to the recommended integrations (e.g. logs, configuration excerpts, or impact summaries) may be presented to authorized users for review. This presentation may be triggered automatically upon completion of a discovery or scoring phase, or upon request if a user elects to view newly flagged references. Suggestions can also appear contextually in a Finding Drawer or Action Drawer if a particular security issue is affected by the flagged reference.

At S530, a determination is made as to whether the suggested connection is accepted.

An indication of acceptance or rejection is received from an authorized party, reflecting approval or disapproval of the recommendation. If acceptance is recognized, the process 500 transitions to S550 for any required authorization. Otherwise, the next action proceeds at S540 to record the suggestion as rejected.

At S540, a rejected suggestion is recorded, and the process 500 moves to the next suggestion if more remain. In some embodiments, a log entry can be appended with notes explaining the reason for the rejection, enabling traceability if organizational circumstances later change. In other embodiments, a full historical log of all suggested connections (accepted or rejected), including timestamps and rationales for auditing or compliance, may be maintained. In some embodiments, previously declined suggestions may be evaluated upon the discovery of new vulnerabilities or shifts in priority.

At S550, authorization is obtained for an accepted connection. When a suggestion has been approved, relevant credentials or permissions may be acquired so that the missing integration is finalized. In some embodiments, an overarching account privilege may already exist, enabling automatic establishment of the connection without further input. Otherwise, credentials or tokens may be requested from a user, ensuring that security and policy requirements are met prior to final onboarding.

At S560, a connection to an unintegrated system is established. Upon receipt of the necessary authorization, configuration details or endpoint references may be applied to bring the newly recognized resource online. In some embodiments, retrieving data from the newly integrated service may begin immediately, enhancing correlation and remediation workflows in near real time. Synchronization of relevant policies or access settings may occur at this stage.

Figure 6:
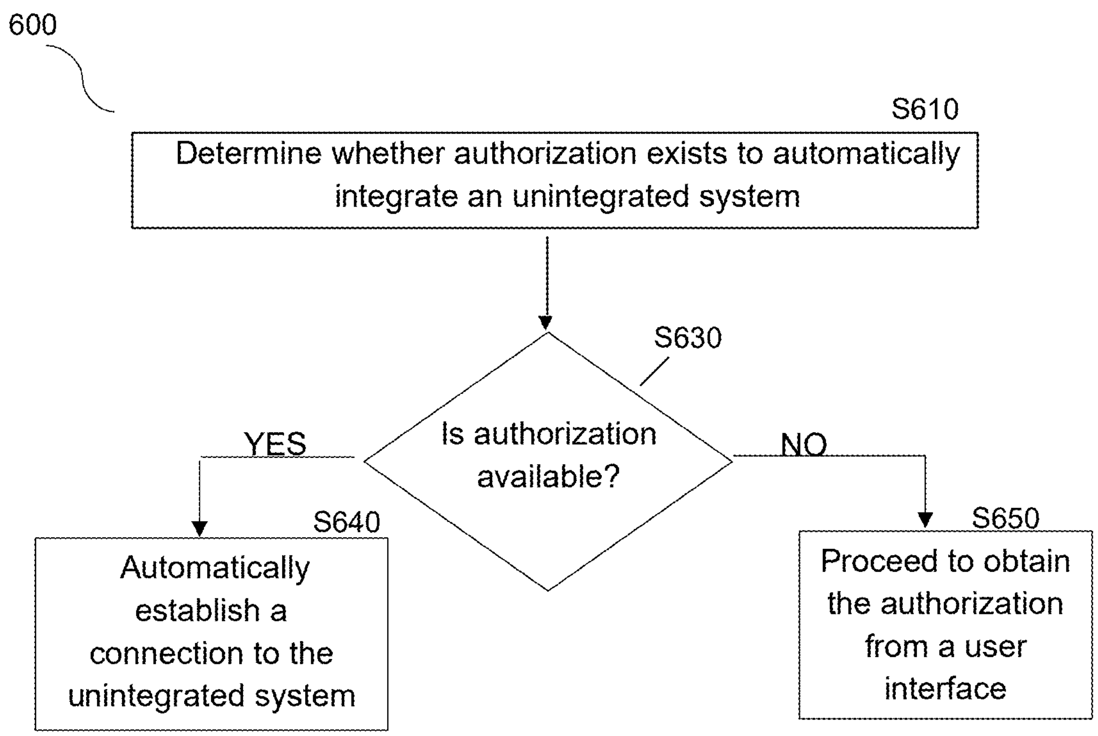
FIG. 6 is an example flowchart showing a process for automatically integrating unintegrated systems based on authorization, in accordance with an embodiment of the present disclosure.

FIG. 6 is an example flowchart showing a process 600 for automatically integrating unintegrated systems based on authorization, in accordance with an embodiment of the present disclosure.

At S610, a determination is made as to whether authorization exists to automatically integrate an unintegrated connection. In some embodiments, broad privileges or tokens may already be available, allowing a new connection to be created without further authorization. For example, a parent account may hold administrative rights that extend across multiple environments, enabling automatic onboarding of related systems. By first assessing whether such overarching permissions apply, unnecessary user prompts can be avoided.

At S630, a check is performed to ascertain whether authorization is readily available.

If the outcome of S610 confirms that sufficient privileges exist, the process 600 branches toward S640; otherwise, it proceeds to S650. In some embodiments, environmental conditions are examined to ensure that security and policy requirements are met before finalizing any automatic connection.

At S640, a connection to the unintegrated resource is automatically established. In some embodiments, when a requisite permission is confirmed, the connection is set up without needing additional credential entry. Configuration details, such as endpoint addresses or access scopes, may be synchronized at this stage.

At S650, authorization is obtained through a user interface when no existing privileges are found. In some embodiments, credentials or tokens are requested from an appropriate party, who may be prompted to grant permission for the newly discovered resource. Once granted, the same onboarding steps used in a manually accepted connection may be performed. This safeguard ensures that only approved integrations are onboarded, aligning the process 600 with organizational policies and compliance standards.

Figure 7:
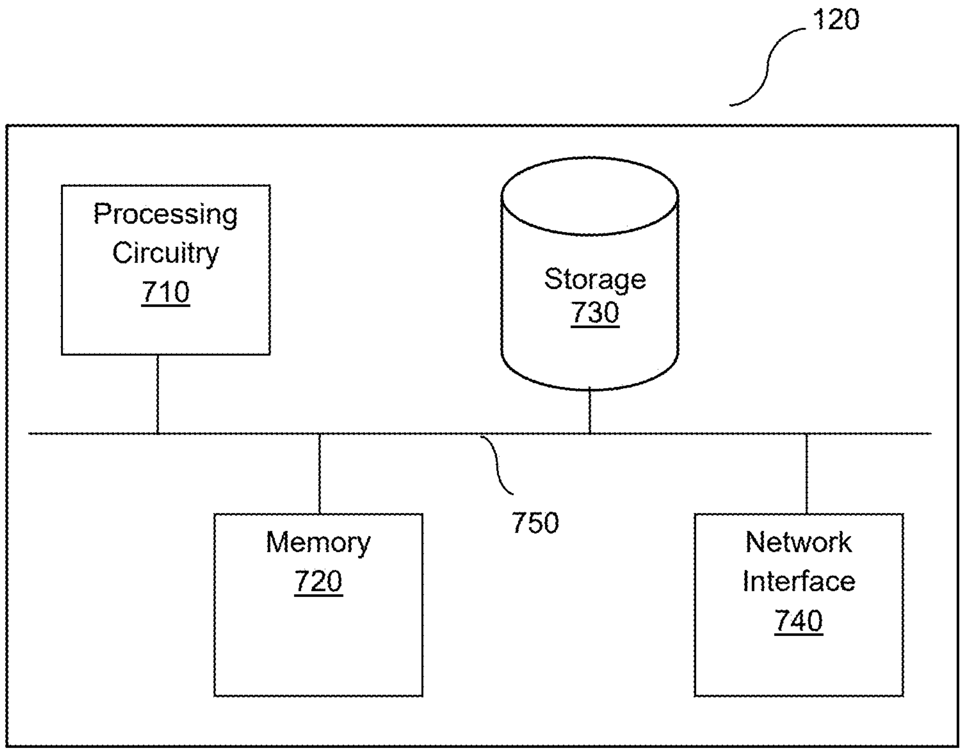
FIG. 7 is an example schematic diagram of an integration orchestration system, in accordance with an embodiment of the present disclosure.

FIG. 7 is an example schematic diagram of an integration orchestration system 120, in accordance with an embodiment of the present disclosure. The integration orchestration system 120 includes a processing circuitry 710 coupled to a memory 720, a storage 730, and a network interface 740. In an embodiment, the components of the integration orchestration system 120 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip (SoC) systems, graphics processing units (GPUs), tensor processing units (TPUs), general-purpose microprocessors, microcontrollers, digital signal processors (DSPs), and the like, or any other hardware logic components capable of performing calculations or other manipulations of information.

The memory 720 may be volatile (e.g., random access memory, etc.), non-volatile (e.g., read-only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. The instructions, when executed by the processing circuitry 710, cause the integration orchestration system 120 to perform the various processes described herein. For example, these processes can include retrieving logs from already integrated systems, applying a rule-based matrix mapping to detect unintegrated systems, generating suggested connections, correlating vulnerabilities to discovered references, and enabling partial or fully automated onboarding.

The storage 730 may be magnetic storage, optical storage, and the like. It may be realized, for example, as flash memory or other memory technology, compact disk-read only memory (CD-ROM), digital versatile disks (DVDs), or any other medium which can be used to store the desired information. In some embodiments, the storage 730 can maintain large volumes of ephemeral log data or historical connection metadata to support the discovery, correlation, and suggestion processes of the integration orchestration system 120.

The network interface 740 allows the integration orchestration system 120 to communicate with other systems, devices, components, or applications. For example, the network interface 740 may be used to obtain logs from container orchestration services (e.g., AWS EKS, ECS), version-control systems (e.g., GitHub), or security scanners, and to provide suggestions or integration prompts to user devices. Through this interface, the integration orchestration system 120 may also finalize onboarding steps for newly recognized integrations once authorization or credentials are supplied.

It should be understood that the embodiments described herein are not limited to the specific architecture illustrated in FIG. 7, and other architectures may be equally used without departing from the scope of the disclosed embodiments. For example, in certain deployments, the data ingestion and discovery logic may be distributed across multiple machines or virtualized environments, while the memory 720 and storage 730 may reside in separate physical devices or cloud-based services.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for identifying and recommending missing system integrations, the method comprising:

obtaining data from one or more integrated systems in a computing environment, wherein integrated systems are onboarded to an orchestration system;

identifying one or more references from the data that correspond to an unintegrated system in the computing environment, wherein the unintegrated system is not onboarded to the orchestration system and identifying the one or more references includes comparing the one or more references against a list of integrated systems;

discovering one or more security findings within the computing environment based at least on a detection by a third-party security scanning tool, wherein the one or more integrated systems include the third-party security scanning tool;

mapping the one or more references to at least one security finding in the one or more security findings;

performing a root-cause analysis of the security finding based on the data;

determining that the unintegrated system is required to complete the root-cause analysis in response to the performed root-cause analysis;

generating at least one suggested connection to the unintegrated system based on the mapped references and determination;

generating a rationale based on the at least one suggested connection, wherein the rationale includes an explanation for completing the root-cause analysis;

displaying, via a client interface, the at least one suggested connection and the rationale;

receiving an indication of acceptance via the client interface;

onboarding the unintegrated system to the orchestration system based on the at least one suggested connection and the received indication of acceptance; and determining a result of the root-cause analysis based on second data obtained from the onboarded unintegrated system.

2. The method of claim 1, wherein identifying the one or more references comprises applying a rule-based detection matrix that defines how to parse different data sources for potential unintegrated systems.

3. The method of claim 1, further comprising partially integrating the unintegrated system by granting restricted or read-only access credentials prior to establishing full integration.

4. The method of claim 1, further comprising maintaining a historical record of discovered unintegrated systems, correlated security findings, and generated suggested connections to facilitate future audits or compliance checks.

5. The method of claim 1, further comprising:

determining misconfigurations based on the mapping; and determining a second rationale for integrating the unintegrated system, the second rationale including an indication of the determined misconfigurations; and displaying the second rationale via the client interface.

6. The method of claim 1, further comprising: analyzing usage metrics associated with the unintegrated system to refine the at least one suggested connection, wherein the usage metrics correspond to how often the unintegrated system is referenced.

7. The method of claim 1, further comprising receiving an indication from an authorized entity whether to proceed with or reject the at least one suggested connection, and recording the indication in a decision log.

8. The method of claim 1, further comprising automatically integrating some or all sub-resources of the unintegrated system upon determining that partial credentials or overarching permissions are available.

9. The method of claim 1, further comprising computing a prioritization metric for the unintegrated system based on at least a frequency with which the unintegrated system is referenced in the obtained data.

10. A non-transitory computer-readable medium storing a set of instructions for identifying and recommending missing system integrations, the set of instructions comprising;

one or more instructions that, when executed by one or more processors of a device, cause the device to:

obtain data from one or more integrated systems in a computing environment, wherein integrated systems are onboarded to an orchestration system;

identify one or more references from the data that correspond to an unintegrated system in the computing environment, wherein the unintegrated system is not onboarded to the orchestration system and identifying the one or more references includes comparing the one or more references against a list of integrated systems;

discover one or more security findings within the computing environment based at least on a detection by a third-party security scanning tool, wherein the one or more integrated systems include the third-party security scanning tool;

map the one or more references to at least one security finding in the one or more security findings;

perform a root-cause analysis of the security finding based on the data;

determine that the unintegrated system is required to complete the root-cause analysis in response to the performed root-cause analysis;

generate at least one suggested connection to the unintegrated system based on the mapped references and determination;

generate a rationale based on the at least one suggested connection, wherein the rationale includes an explanation for completing the root-cause analysis;

display, via a client interface, the at least one suggested connection and the rationale;

receive an indication of acceptance via the client interface;

onboard the unintegrated system to the orchestration system based on the at least one suggested connection and the received indication of acceptance; and determine a result of the root-cause analysis based on second data obtained from the onboarded unintegrated system.

11. A system for identifying and recommending missing system integrations comprising:

a processing circuitry;

a memory, the memory containing instructions that, when executed by the processing circuitry, configure the system to:

obtain data from one or more integrated systems in a computing environment, wherein integrated systems are onboarded to an orchestration system;

identify one or more references from the data that correspond to an unintegrated system in the computing environment, wherein the unintegrated system is not onboarded to the orchestration system and identifying the one or more references includes comparing the one or more references against a list of integrated systems;

discover one or more security findings within the computing environment based at least on a detection by a third-party security scanning tool, wherein the one or more integrated systems include the third-party security scanning tool;

map the one or more references to at least one security finding in the one or more security findings;

perform a root-cause analysis of the security finding based on the data;

determine that the unintegrated system is required to complete the root-cause analysis in response to the performed root-cause analysis;

generate at least one suggested connection to the unintegrated system based on the mapped references and determination;

generate a rationale based on the at least one suggested connection, wherein the rationale includes an explanation for completing the root-cause analysis;

display, via a client interface, the at least one suggested connection and the rationale;

receive an indication of acceptance via the client interface;

onboard the unintegrated system to the orchestration system based on the at least one suggested connection and the received indication of acceptance; and determine a result of the root-cause analysis based on second data obtained from the onboarded unintegrated system.

12. The system of claim 11, wherein the memory contains further instructions that when executed by the processing circuitry to identify the one or more references, further configure the system to:

apply a rule-based detection matrix that defines how to parse different data sources for potential unintegrated systems.

13. The system of claim 11, wherein the memory contains further instructions that when executed by the processing circuitry further configure the system to:

partially integrate the unintegrated system by granting restricted or read-only access credentials prior to establishing full integration.

14. The system of claim 11, wherein the memory contains further instructions that when executed by the processing circuitry further configure the system to:

maintain a historical record of discovered unintegrated systems, correlated security findings, and generated suggested connections to facilitate future audits or compliance checks.

15. The system of claim 11, wherein the memory contains further instructions that when executed by the processing circuitry to generate the at least one suggested connection, further configure the system to:

determine misconfigurations based on the mapping; and determine a second rationale for integrating the unintegrated system, the second rationale including an indication of the determined misconfigurations; and display the second rationale via the client interface.

16. The system of claim 11, wherein the memory contains further instructions that when executed by the processing circuitry further configure the system to:

analyze usage metrics associated with the unintegrated system to refine the at least one suggested connection, wherein the usage metrics correspond to how often the unintegrated system is referenced.

17. The system of claim 11, wherein the memory contains further instructions that when executed by the processing circuitry further configure the system to:

receive an indication from an authorized entity whether to proceed with or reject the at least one suggested connection, and recording the indication in a decision log.

18. The system of claim 11, wherein the memory contains further instructions that when executed by the processing circuitry further configure the system to:

automatically integrate some or all sub-resources of the unintegrated system upon determining that partial credentials or overarching permissions are available.

19. The system of claim 11, wherein the memory contains further instructions that when executed by the processing circuitry further configure the system to:

compute a prioritization metric for the unintegrated system based on at least a frequency with which the unintegrated system is referenced in the obtained data.

* * * * *